United States Patent
Joergl et al.

(10) Patent No.: US 9,057,319 B2
(45) Date of Patent: Jun. 16, 2015

(54) MULTI-STAGE TURBOCHARGER ARRANGEMENT

(75) Inventors: Volker Joergl, Breitenfurt (AT); Timm Kiener, Lake Orion, MI (US); Thomas Kritzinger, Frankenburg a.H. (AT)

(73) Assignee: BorgWarner Inc., Auburn Hills, MI (US)

( * ) Notice: Subject to any disclaimer, the term of this patent is extended or adjusted under 35 U.S.C. 154(b) by 141 days.

(21) Appl. No.: 13/377,630

(22) PCT Filed: Jun. 18, 2010

(86) PCT No.: PCT/US2010/039146
§ 371 (c)(1),
(2), (4) Date: Dec. 12, 2011

(87) PCT Pub. No.: WO2011/008411
PCT Pub. Date: Jan. 20, 2011

(65) Prior Publication Data
US 2012/0087785 A1 Apr. 12, 2012

(30) Foreign Application Priority Data

Jun. 29, 2009 (DE) .......................... 10 2009 031 025

(51) Int. Cl.
*F02B 37/013* (2006.01)
*F01D 25/16* (2006.01)
(Continued)

(52) U.S. Cl.
CPC ............ *F02B 37/013* (2013.01); *F01D 25/162* (2013.01); *F01D 25/24* (2013.01); *F02B 37/127* (2013.01); *F02B 37/16* (2013.01); *F02B 37/18* (2013.01); *F02B 37/22* (2013.01); *F02B 39/00* (2013.01); *F02C 6/12* (2013.01); *Y02T 10/144* (2013.01); *F02B 37/004* (2013.01); *F05D 2240/40* (2013.01)

(58) Field of Classification Search
CPC .... Y02T 10/144; F02B 37/013; F02B 37/004
USPC .............................. 417/375, 405–407; 60/612
See application file for complete search history.

(56) References Cited

U.S. PATENT DOCUMENTS 4,196,593 A * 4/1980 Froeliger ........................ 60/612
4,930,315 A * 6/1990 Kanesaka ....................... 60/600
(Continued)

FOREIGN PATENT DOCUMENTS

| JP | 2005344714 A | 12/2005 |
|---|---|---|
| KR | 20060048176 A | 5/2006 |
| WO | 2007084592 A2 | 7/2007 |

OTHER PUBLICATIONS

International Search Report and Written Opinion; date of mailing, Feb. 15, 2011 ; for international application No. PCT/US2010/039146 ; 10 Pages.

*Primary Examiner* — Peter J Bertheaud
(74) *Attorney, Agent, or Firm* — BrooksGroup

(57) ABSTRACT

The present invention relates to a multi-stage turbocharger arrangement (1), having a high-pressure turbocharger (20) which has a turbine housing (26A), a bearing housing (27A), a compressor housing (28A); and having a low-pressure turbocharger (21) which has a turbine housing (26B), a bearing housing (27B), a compressor housing (28B); wherein the turbine housings (26A, 26B) are provided with an integrated inner shell (23) for conducting exhaust gas.

15 Claims, 2 Drawing Sheets

Figure 1:
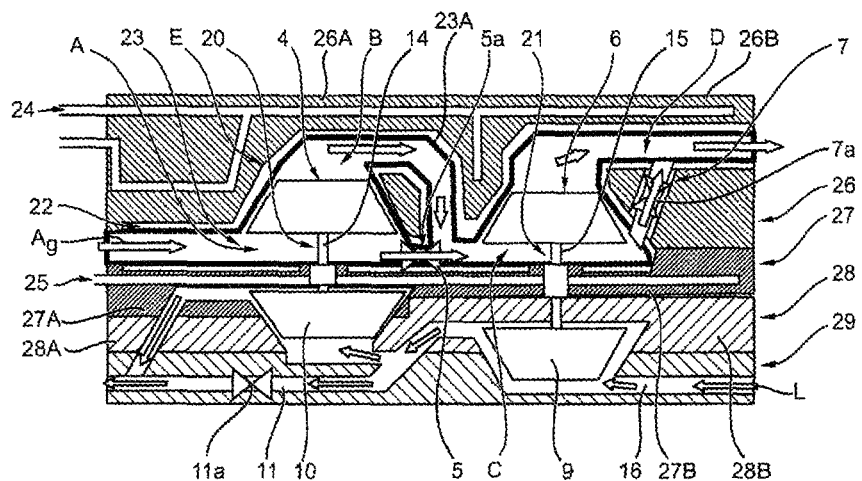

(51) Int. Cl.
*F01D 25/24* (2006.01)
*F02B 37/12* (2006.01)
*F02B 37/16* (2006.01)
*F02B 37/18* (2006.01)
*F02B 37/22* (2006.01)
*F02B 39/00* (2006.01)
*F02C 6/12* (2006.01)
*F02B 37/00* (2006.01)

(56) References Cited

U.S. PATENT DOCUMENTS

| | | | |
|---|---|---|---|
| 5,577,900 A * | 11/1996 | Ramsden et al. | 417/407 |
| 6,282,899 B1 * | 9/2001 | Gladden | 60/612 |
| 8,863,514 B2 * | 10/2014 | Joergl et al. | 417/407 |
| 2006/0042247 A1 | 3/2006 | Haugen | |

* cited by examiner

MULTI-STAGE TURBOCHARGER ARRANGEMENT

This application claims the benefit of German Application Serial No. 10 2009 031025.8 filed Jun. 29, 2009 and PCT Application Serial No. 2010/039146 filed Jun. 18, 2010.

The invention relates to a multi-stage turbocharger arrangement for an internal combustion engine, as per the preamble of claim 1.

Conventional multi-stage turbocharger arrangements known from the prior art are generally constructed from at least two turbochargers arranged in series. Exhaust gas leakage occurring in said systems, in particular downstream of the closed high-pressure turbine bypass valve, prevents optimum functioning in all operating states of the turbocharger arrangement. In the prior art, said leakage is prevented in that the bypass valves which are used have very slight leakage at the valve seat. In the multi-stage turbocharger arrangements of the prior art, which have an air gap in order to reduce the heat transfer between the exhaust-gas flow ducts and the turbine housings and which have a high-pressure turbine bypass valve which is likewise surrounded by an air gap, considerable exhaust-gas leakage can however also occur downstream of the closed high-pressure turbine bypass valve through the air gap which surrounds the high-pressure turbine bypass valve.

It is therefore an object of the present invention to provide a multi-stage turbocharger arrangement whose efficiency is improved in relation to known turbocharger arrangements.

Said object is achieved by means of the features of claim 1.

The subclaims relate to advantageous refinements of the invention.

The arrangement of an integrated inner shell for conducting exhaust gas in the turbine housings results in an improvement in efficiency because the supply of exhaust gases to the turbines is optimized. Furthermore, this results in a drastic reduction in the exhaust-gas leakage quantity in the region of the turbine housing in relation to the turbocharger arrangements of the prior art. Furthermore, as a result of the integrated inner shell, it is possible in particular to realize improved heat insulation in relation to the turbine and bearing housing units.

Figure 2:
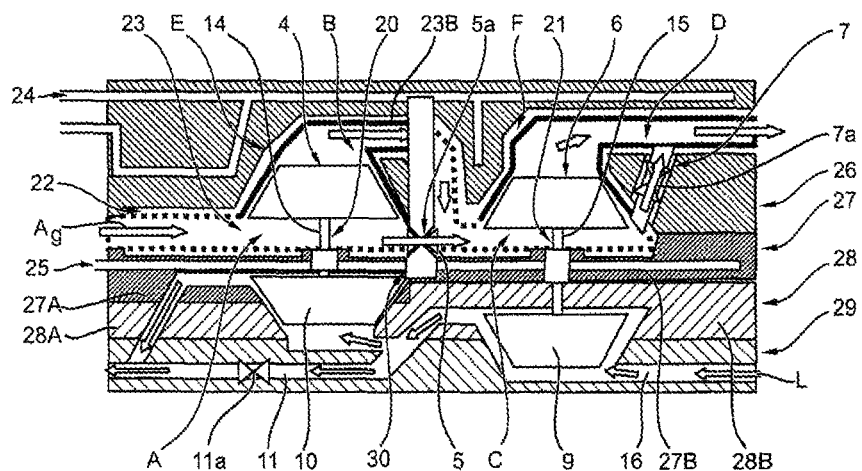
Figure 3:
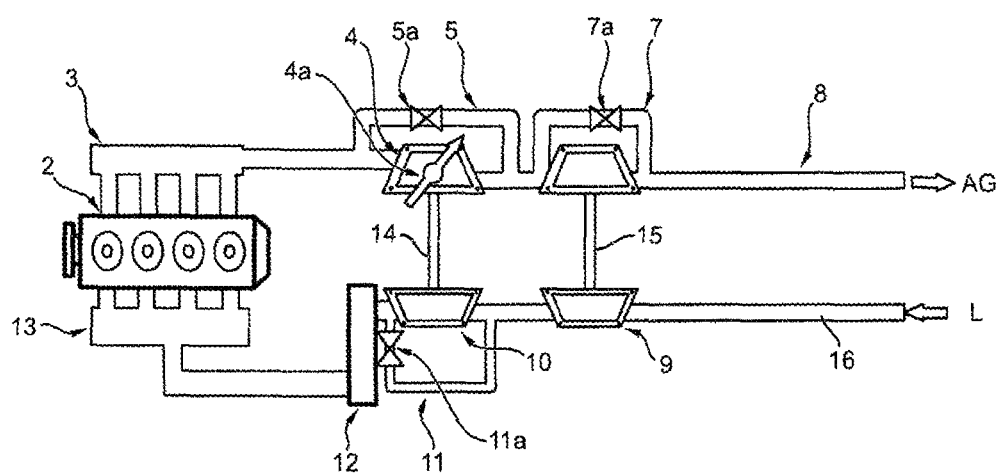

Further details, features and advantages of the invention will emerge from the following description of exemplary embodiments on the basis of the drawing, in which:

FIG. 1 shows a schematically simplified illustration of a first embodiment of a multi-stage turbocharger arrangement according to the invention, FIG. 2 shows a schematically simplified illustration of a second embodiment of the multi-stage turbocharger arrangement according to the invention, and FIG. 3 shows a schematically simplified illustration of a multi-stage turbocharger arrangement of the prior art.

With reference to FIG. 1, a first embodiment of the multi-stage turbocharger arrangement 1 according to the invention will be described below. As can be seen from FIG. 1, the multi-stage turbocharger arrangement 1 has a high-pressure turbocharger 20, which has a high-pressure turbine 4 which is connected by means of a shaft 14 to a high-pressure compressor 10, and a low-pressure turbocharger 21, which has a low-pressure turbine 6 which is connected by means of a shaft 15 to a low-pressure compressor 9. The high-pressure turbine 4 and the low-pressure turbine 6 are arranged in a common turbine housing unit 26, which is divided into a turbine housing section 26A of the high-pressure turbocharger 20 and a turbine housing section 26B of the low-pressure turbocharger 21. An inner shell 23 which can expand as a result of heat is inserted into the interior of the turbine housing unit 26, in the interior of which inner shell 23 hot engine exhaust gas Ag flows through the high-pressure turbine 4 and the low-pressure turbine 6. The inner shell 23 of said first embodiment of the multi-stage turbocharger arrangement 1 has an all-round sealing jacket 23A which is arranged on those surfaces of the inner shell 23 which are adjacent to the air gap 22.

Formed between the sealing jacket 23A of the inner shell 23 and the turbine housing unit 26 and also the bearing housing unit 27 is an air gap 22 which insulates the inner shell 23, which is heated by the engine exhaust gas A, with respect to the turbine housing unit 26 and the bearing housing unit 27. Furthermore, the turbine housing unit 26 and bearing housing unit 27 have formed in them cooling ducts 24 and 25 respectively for a coolant which flows therein which reduces the temperature of the turbine housing unit 26 and of the bearing housing unit 27 or keeps said temperature at a level which is admissible in all operating states of the turbocharger arrangement 1.

Also formed in the turbine housing section 26A of the high-pressure turbocharger 20 is a bypass 5 of the high-pressure turbine 4, which bypass 5 has a regulating valve 5a by means of which the engine exhaust gas A bypasses the high-pressure turbine 4 when the regulating valve 5a is open. Furthermore, a wastegate arrangement 7 is formed in the turbine housing section 26B of the low-pressure turbocharger 21, in the interior of which wastegate arrangement 7 is arranged a wastegate valve 7a. When the wastegate valve 7a is open, a part of the flow of the engine exhaust gas A can bypass the low-pressure turbine 6 and flow directly into an exhaust 8 (see FIG. 3).

The shaft 14 of the high-pressure turbocharger 20 and the shaft 15 of the low-pressure turbocharger 21 are mounted in a common bearing housing unit 27 which is assembled from a bearing housing section 27A of the high-pressure turbocharger 20 and a bearing housing section 27B of the low-pressure turbocharger 21.

The high-pressure compressor 10 of the high-pressure turbocharger 20 and the low-pressure compressor 9 of the low-pressure turbocharger 21 are arranged in a common compressor housing unit 28 which is assembled from a compressor housing section 28A of the high-pressure turbocharger 20 and a compressor housing section 28B of the low-pressure turbocharger 21 and which is closed by means of a compressor cover 29. As can be seen from the illustration of FIG. 1, the high-pressure compressor 10 is partially also formed in the bearing housing unit 27 and the low-pressure compressor 9 is partially also formed in the compressor cover 29.

As can also be seen from FIG. 1, air L is supplied to the low-pressure compressor 9 from the outside via a duct 16 formed in the compressor cover 29, which duct 16, over its further profile, is formed in the compressor housing unit 28 between the low-pressure compressor 9 and the high-pressure compressor 10, and runs through the bearing housing unit 27, the compressor housing unit 28 and the compressor cover 29 downstream of the high-pressure compressor 10. Furthermore, a compressor bypass duct 11 is formed in the compressor cover 29 in the region of the high-pressure compressor 10, which compressor bypass duct 11 comprises a compressor bypass valve 11a. Through said compressor bypass duct 11, the charge air L can be conducted entirely or partially around the high-pressure compressor 10 in order to prevent throttling of the high-pressure compressor 10 at large air flow quantities.

The connecting surfaces, which are formed substantially parallel to one another, of the common turbine housing unit 26, bearing housing unit 27 and compressor housing unit 28 are connected to one another by means of screw connections, welded connections, adhesive connections and/or clamping connections, even if this is not illustrated in FIG. 1.

In the case of the inner shell 23 with all-round sealing jacket 23A with respect to the surrounding air gap 22, the regulating valve 5a in the bypass 5 of the high-pressure turbine 4 is integrated into the inner shell 23, such that when the regulating valve 5a is closed, substantially no exhaust gas can pass from a region A upstream of the high-pressure turbine 4 into a region C downstream of the high-pressure turbine 4 without passing through the high-pressure turbine 4.

Furthermore, the wastegate valve 7a of the low-pressure turbine 6 is integrated into the inner shell 23, such that when the wastegate valve 7a is closed, substantially no exhaust gas can pass from a region C upstream of the low-pressure turbine 6 into a region D downstream of the low-pressure turbine 6 without passing through the low-pressure turbine 6.

Furthermore, the inner shell 23 is fully sealed off, such that exhaust gas from the regions A, B upstream and downstream of the high-pressure turbine 4 and regions C, D upstream and downstream of the low-pressure turbine 6 cannot escape into a region E of the surrounding air gap 23, nor can said exhaust gas bypass the high-pressure turbine 4 or the low-pressure turbine 6 or the high-pressure turbine regulating valve 5a or low-pressure turbine bypass valve 7a or emerge into the environment. The inner shell 23 is designed such that it can expand and contract in a heat-dependent manner in order to compensate thermal stresses occurring during a temperature cycle without losing its sealing capability. Here, the inner shell 23 must enable the greatest possible thermal expansion.

Furthermore, all parts of the inner shell 23 and the connections at which the different parts of the inner shell 23 adjoin one another and at which the inner shell 23 begins and ends must withstand high pressures and pressure shocks without losing their sealing capability.

Furthermore, all connections within the inner shell 23 must provide sealing despite a movement as a result of the thermal expansion of the hot parts.

Furthermore, it is possible for the sealing surface of the inner shell 23 to be specifically designed according to the number of parts of the inner shell 23.

A second embodiment of the multi-stage turbocharger arrangement according to the invention will be described below with reference to FIG. 2. Here, identical components are denoted by the same reference symbols as in the first embodiment shown in FIG. 1. The second embodiment differs from the first embodiment described above in that the inner shell 23 is provided here with a partial sealing jacket 23B and, downstream of the high-pressure turbine 4, is provided with a gas barrier 30.

In said second embodiment with the inner shell 23 with partial sealing jacket 23B, it is also possible for at least the high-pressure turbine regulating valve 5a to be integrated into the inner shell 23.

Furthermore, it is possible here for at least one gas barrier 30 to be implemented such that a flow from the region E of the air gap 22 in the region of the high-pressure turbine 4 into a region F of the air gap 22 in the region of the low-pressure turbine 6 is not possible. When the high-pressure turbine regulating valve 5a is closed, a considerable pressure difference is generated upstream and downstream of the regulating valve 5a, and therefore between the region A upstream of the high-pressure turbine 4 and the region E of the air gap 22 in the region of the high-pressure turbine 4, and also the region B downstream of the high-pressure turbine 4 and the regions C, D, F upstream and downstream of the low-pressure turbine. As a result of the gas barrier, it is not possible for exhaust gas to bypass the regulating valve 5a via the region E of the air gap 22 in the region of the high-pressure turbine 4 and via the region F of the air gap 22 in the region of the low-pressure turbine 6.

In this simpler and more cost-effective but not completely leakage-free embodiment of the inner shell 23 which has no sealing jacket in the region A upstream of the high-pressure turbine 4 and around the region C upstream of the low-pressure turbine 6, gas leakage through the gas barrier 30 from the region E to the region F is not possible, but a slight leakage or a pressure equalization between the regions A, E upstream of the gas barrier 30 and the regions C, F downstream of the gas barrier 30 takes place to a small extent and is therefore acceptable.

The merely insulating regions A and C (upstream of the high-pressure turbine and upstream of the low-pressure turbine) of the inner shell 23 without a sealing jacket may be designed as "floating" elements with properties such that they expand and contract without restriction. In this way, only slight thermal stresses occur in said elements.

The inner shell 23 around the region B downstream of the high-pressure turbine 4 and the region D downstream of the low-pressure turbine 6 must have a complete sealing capability in order to prevent a flow from the region E of the air gap 22 (in the region of the high-pressure turbine 4) into the region B (downstream of the high-pressure turbine 4). The sizes or volumes of said regions B and D are correspondingly minimized.

Furthermore, in a "bottleneck" position within the inner shell 23, the gas barrier 30 is formed such that the required sealing surface is minimal.

Furthermore, it is possible for a metal seal to be used on the gas barrier, which metal seal can absorb the thermal expansion but still seal off the inner shell 23 with respect to the cooled adjoining housings.

It is alternatively possible to use an elastic insulating material, such as for example fiber mats, with an adequate flow barrier functionality to seal off the required air gap 23 in the gas barrier 30 around the housing of the high-pressure turbine regulating valve 5a, wherein other materials with a corresponding flow barrier functionality may alternatively also be used.

It is also advantageous for the region of the gas barrier 30 to be cooled, because said region is one of the main regions of contact between the hot inner shell 23 and the cooled outer housings.

The gas barrier 30 is preferably designed such that a self-sealing function is assisted by the pressure difference between the region A upstream of the high-pressure turbine 4 and the region C upstream of the low-pressure turbine 6 during operation.

Furthermore, the gas barrier 30 may preferably be designed so as to provide sealing by means of the pressure of a spring force.

In the embodiments of the multi-stage turbocharger arrangement according to the invention illustrated in FIGS. 1 and 2, the hot exhaust gas flows only in the inner shell 23, which is arranged in a sandwich-like manner between the turbine housing unit 26 and the bearing housing unit 27, which have the cooling ducts 24 and 25, in order to prevent overheating of the turbine housing unit 26 and of the bearing housing unit 27. The cooling ducts 24 and 25 may alternatively also be connected to one another. In further conceivable embodiments, the housing units 26, 27 and 28 may also be divided differently than in the embodiments illustrated here. Furthermore, it is alternatively also possible for all the housing units to be cooled or for only parts of the exhaust gas flow ducts to be insulated by an air gap.

In both embodiments, the high-pressure turbine 4 and the low-pressure turbine 6 or the low-pressure compressor 9 and the high-pressure compressor 10 can each have a variable turbine geometry which, in FIG. 3, is denoted by way of example by the reference symbol 4a in the case of the high-pressure turbine 4. Furthermore, the compressor bypass valve 11a may be an automatic or regulated valve, and the wastegate valve 7a may be omitted in some arrangements in order to save costs.

FIG. 3 shows a schematically simplified illustration of a multi-stage turbocharger arrangement of the prior art, as is used for example in a conventional two-stage turbocharger system of a diesel engine. Here, identical components are denoted by the same reference symbols as in FIGS. 1 and 2. The multi-stage turbocharger arrangement 10 illustrated in FIG. 3 indicates the flow profile of the exhaust gas A of an engine 2 from an exhaust manifold 3 to the discharge through an exhaust 8, and the flow profile of the inducted air L through an intake line 16 to an intake manifold 13 of the engine 2. Said conventional turbocharger arrangement is known in numerous similar designs and variations, the construction of which will however not be described in any more detail here.

The multi-stage turbocharger arrangement according to the invention has significantly improved efficiency in relation to the known turbocharger arrangements of the prior art on account of significantly reduced leakage in the region of the turbine housing, of the bypass valve and of the wastegate valve and further optimized heat insulation between the exhaust ducts and the adjoining housing parts.

To supplement the disclosure, reference is explicitly made to the diagrammatic illustration of the invention in FIGS. 1 and 2.

LIST OF REFERENCE SYMBOLS

1 Multi-stage turbocharger arrangement
2 Engine
3 Exhaust manifold
4 High-pressure turbine
4a Variable turbine geometry
5 Bypass of the high-pressure turbine
5a Regulating valve
6 Low-pressure turbine
7 Wastegate arrangement
7a Wastegate valve
8 Exhaust
9 Low-pressure compressor
10 High-pressure compressor
11 Compressor bypass duct
11a Compressor bypass valve
12 Charge-air cooler
13 Intake manifold
14 Shaft of the high-pressure turbocharger
15 Shaft of the low-pressure turbocharger
16 Duct
20 High-pressure turbocharger
21 Low-pressure turbocharger
22 Air gap
23 Inner shell
23A All-round sealing jacket
23B Partial sealing jacket
24 Cooling duct in the turbine housing unit
25 Cooling duct in the bearing housing unit
26 Turbine housing unit
26A Turbine housing section of the high-pressure turbocharger
26B Turbine housing section of the low-pressure turbocharger
27 Bearing housing unit
27A Bearing housing section of the high-pressure turbocharger
27B Bearing housing section of the low-pressure turbocharger
28 Compressor housing unit
28A Compressor housing section of the high-pressure turbocharger
28B Compressor housing section of the low-pressure turbocharger
29 Compressor cover
30 Gas barrier
Ag Engine exhaust gas
L Inducted air

The invention claimed is:

1. A product comprising a multi-stage turbocharger arrangement, having a high-pressure turbocharger which has
   a first turbine housing,
   a first bearing housing,
   a first compressor housing; and
having a low-pressure turbocharger which has
   a second turbine housing,
   a second bearing housing,
   a second compressor housing; wherein
an interior of the first and second turbine housings is provided with an integrated inner shell for conducting exhaust gas wherein an air gap is provided between the inner shell and the first and second turbine housings, wherein the inner shell is configured so that exhaust gas flows through the inner shell but not through the air gap.

2. A product as set forth in claim 1, wherein the inner shell is surrounded by the air gap.

3. A product comprising a multi-stage turbocharger arrangement, having a high-pressure turbocharger which has
   a first turbine housing,
   a first bearing housing,
   a first compressor housing; and
having a low-pressure turbocharger which has
   a second turbine housing,
   a second bearing housing,
   a second compressor housing; wherein
an interior of the first and second turbine housings is provided with an integrated inner shell for conducting exhaust gas wherein an air gap is provided between the inner shell and the first and second turbine housings, wherein the inner shell is configured so that exhaust gas flows through the inner shell but not through the air gap, wherein the inner shell has an all-round sealing jacket.

4. A product as set forth in claim 3, wherein the sealing jacket is arranged on those surfaces of the inner shell which are adjacent to the air gap.

5. A product comprising a multi-stage turbocharger arrangement, having a high-pressure turbocharger which has
   a first turbine housing,
   a first bearing housing,
   a first compressor housing; and
having a low-pressure turbocharger which has
   a second turbine housing,
   a second bearing housing,
   a second compressor housing; wherein
an interior of the first and second turbine housings is provided with an integrated inner shell for conducting exhaust gas wherein an air gap is provided between the inner shell and the first and second turbine housings, wherein the inner shell is configured so that exhaust gas flows through the inner shell but not through the air gap, wherein the inner shell is provided with a partial sealing jacket and, downstream of the high-pressure turbine, is provided with a gas barrier.

6. A product as set forth in claim 1, wherein at least one of
i) the first and second turbine housings are combined to form at least one turbine housing unit,
ii) the first and second bearing housings are combined to form at least one bearing housing unit, or
iii) the first and second compressor housings are combined to form at least one compressor housing unit.

7. A product as set forth in claim 6, wherein the turbine housing unit, the bearing housing unit and the compressor housing unit are connected to one another by means of a screw connection, welded connection, adhesive connection or clamping connection.

8. A product comprising a multi-stage turbocharger arrangement, having a high-pressure turbocharger which has
a first turbine housing,
a first bearing housing,
a first compressor housing; and
having a low-pressure turbocharger which has
a second turbine housing,
a second bearing housing,
a second compressor housing; wherein
an interior of the first and second turbine housings is provided with an integrated inner shell for conducting exhaust gas wherein an air gap is provided between the inner shell and the first and second turbine housings, wherein the inner shell is configured so that exhaust gas flows through the inner shell but not through the air gap, wherein a high-pressure turbine of the high-pressure turbocharger has an integrated bypass wherein a valve is integrated into the inner shell such that the valve is configured to allow exhaust gas to bypass the first turbine, providing the integrated bypass.

9. A product as set forth in claim 8 wherein a low-pressure turbine of the low-pressure turbocharger has an integrated wastegate arrangement.

10. A product as set forth in claim 6 wherein the bearing housing unit is provided with at least one cooling duct.

11. A product as set forth in claim 6 wherein the turbine housing unit is provided with at least one cooling duct.

12. A product comprising a multi-stage turbocharger arrangement, having a high-pressure turbocharger which has
a first turbine housing,
a first bearing housing,
a first compressor housing; and
having a low-pressure turbocharger which has
a second turbine housing,
a second bearing housing,
a second compressor housing; wherein
an interior of the first and second turbine housings is provided with an integrated inner shell for conducting exhaust gas wherein an air gap is provided between the inner shell and the first and second turbine housings, wherein the inner shell is configured so that exhaust gas flows through the inner shell but not through the air gap, wherein the inner shell comprises at least a partial sealing jacket.

13. A product comprising a multi-stage turbocharger arrangement, having a high-pressure turbocharger which has
a single housing having a cavity with a shell positioned in the cavity, the shell being configured to direct a flow exhaust gases through the housing and the shell being spaced apart from the housing by an air gap,
a first turbine positioned in the shell and being rotatable in response to the flow of exhaust gases,
a second turbine positioned in the shell and being rotatable in response to the flow of exhaust gases;
a first duct in the shell directing the flow of exhaust gases to a first region in the shell that is upstream in the flow of exhaust gases from the first turbine and the flow of exhaust gases flowing through the first region to the first turbine;
a second region in the shell that is downstream in the flow of exhaust gases from the first turbine;
a second duct in the shell directing the flow of exhaust gases from the second region to a third region in the shell that is upstream in the flow of exhaust gases from the second turbine, wherein the flow of exhaust gases may pass from the first region rotating the first turbine and through the second region and the second duct to the third region;
a first valve integrated into the shell and being configured to selectively admit the flow of exhaust gases from the first region to the third region without passing through the second region or the second duct;
a fourth region in the shell that is downstream in the flow of exhaust gases from the first turbine;
a third duct in the shell directing the flow of exhaust gases from the fourth region out of the housing, wherein the flow of exhaust gases may pass from the third region rotating the second turbine and through the fourth region and the third duct out of the housing;
a second valve configured to selectively admit the flow of exhaust gases from the third region to the third duct without passing through the fourth region.

14. A product according to claim 13 further comprising a cover positioned on the housing with a first compressor rotated by the first turbine and a second compressor rotated by the second turbine positioned in the housing wherein a flow path through the cover is configured so that air flows into the cover and first around the second compressor and then around the first compressor before exiting the housing.

15. A product according to claim 14 further comprising a bypass duct in the cover that is configured to allow air to flow from the second turbine and out of the cover without flowing around the first compressor.

* * * * *